US008762590B2

(12) United States Patent
Mari et al.

(10) Patent No.: US 8,762,590 B2
(45) Date of Patent: Jun. 24, 2014

(54) COMMUNICATION SYSTEM FOR A CONTROL CHANNEL, AND CORRESPONDING METHOD AND COMPUTER PROGRAM PRODUCT

(75) Inventors: Ugo Mari, Tremestieri (IT); Francesco Bombaci, Messina (IT); Pietro Cusmano, Palmero (IT); Sonia Sfasciotti, Acireale (IT)

(73) Assignee: STMicroelectronics s.r.l., Agrate Brianza (MI) (IT)

( * ) Notice: Subject to any disclaimer, the term of this patent is extended or adjusted under 35 U.S.C. 154(b) by 236 days.

(21) Appl. No.: 12/830,162

(22) Filed: Jul. 2, 2010

(65) Prior Publication Data
US 2011/0026613 A1 Feb. 3, 2011

(30) Foreign Application Priority Data
Jul. 31, 2009 (IT) .............................. TO2009A0600

(51) Int. Cl.
*G06F 3/00* (2006.01)
(52) U.S. Cl.
USPC ........................................................... 710/14
(58) Field of Classification Search
None
See application file for complete search history.

(56) References Cited

U.S. PATENT DOCUMENTS

2006/0280055 A1* 12/2006 Miller et al. ................ 369/44.11
2007/0294551 A1* 12/2007 Wu et al. ........................ 713/320

OTHER PUBLICATIONS

IT Search Report, Jul. 31, 2009, IT Application No. TO20090600, pp. 1-7.
Sterzik, C., "CEC-to-I2C Bridge With the MSP430", Texas Instruments, http://focus.ti.com/lit/an/slaa377/slaa377.pdf; Dec. 2007, pp. 1-15.
"High-performance32-bit Microcontroller with Built-in HDMI-CEC Reception Function and 11-channel Serial Interface for Application in AV Devices MB91313 Series", FIND vol. 26 No. 2, http://www.fujitsu.com/downloads/EDG/binary/pdf/find/26-2e/3.pdf; Jan. 1, 2008, pp. 1-4.
Italian First Office Action, Application No. TO2009A000600, dated Oct. 26, 2011, Procedimento di esame., Ministero dello Sviluppo Economico, Torino, Italy, pp. 1.

* cited by examiner

*Primary Examiner* — Henry Tsai
*Assistant Examiner* — Juanito Borromeo
(74) *Attorney, Agent, or Firm* — Hogan Lovells US LLP

(57) ABSTRACT

A communication system for an HDMI communication interface CEC channel includes a communication module for receiving messages via the CEC channel, a processing unit for processing the received messages and an oscillator for driving the communication module. When the interface is in an active mode, the system is operative to activate the timer upon detection of the start of transmission of a first message, detect the initial bit of the first message, reconstruct and process the first message, and switch the interface from the active mode to standby by deactivating the oscillator. When the interface is in standby, the system is operative to switch the interface to the active condition by activating the oscillator and the timer when the start of a transmission of a second message is detected, detect the initial bit of a transmission of the second message, and reconstruct and process the second message.

18 Claims, 2 Drawing Sheets

COMMUNICATION SYSTEM FOR A CONTROL CHANNEL, AND CORRESPONDING METHOD AND COMPUTER PROGRAM PRODUCT

RELATED APPLICATION

The present application claims priority of Italian Patent Application No. TO2009A000600 filed Jul. 31, 2009, which is incorporated herein in its entirety by this reference.

FIELD OF THE INVENTION

The present invention relates to devices that use control channels, such as for example the control channel "Consumer Electronics Control" (CEC) of a high-definition multimedia interface (HDMI). The invention has in particular been developed for the purpose of detecting correctly the start of a transmission on the CEC channel when the device is in standby.

DESCRIPTION OF RELATED ART

High-definition multimedia interface (HDMI) is a completely digital commercial standard for the interfacing of audio and video signals. In particular, the HDMI standard specifies the "Consumer Electronics Control" (CEC) channel, which enables communication of control signals between interconnected components, for example devices of the "home theatre" type. In particular, the standard envisages that all the devices are connected together with an HDMI bus, in which a single device (for example a remote control) can control operation of a plurality of devices. For example, the user can control turning-on and/or turning-off of the devices with a key of the remote control of a television set.

In order to be able to acknowledge a command received from another device, the device must remain activated. This causes an additional consumption because the communication interface of the device remains supplied, with the device in the standby condition.

However, the standard on the HDMI-CEC channel does not provide any specification on the limitations of consumption or techniques for reduction of consumption, even though the energy consumption in the standby condition is a fundamental parameter that all manufacturers have to consider. For instance, the compliance with the last version of the Energy Star guidelines imposes the need to meet severe constraints.

SUMMARY OF THE INVENTION

The object of the invention is to reduce the consumption of the HDMI interface in the standby condition, otherwise keeping the performance of the system unaltered.

With a view to achieving the aforesaid object, the subject of the invention is a communication system for the CEC channel of an HDMI communication interface which is switchable between an active condition and a standby condition. The system includes a communication module for receiving messages from the CEC channel, wherein the communication module includes a timer, a processing unit for processing the received messages, and an oscillator for driving the communication module. When the interface is in the active condition, the system is configured for activating the timer when the beginning of a transmission of a first message is detected on the CEC channel, detecting the transmission start bit of the first message via the timer using a first plurality of reference values, reconstructing and processing the first message, and detecting the presence of other remaining activities to be performed and, in the absence of other remaining activities, switching the interface from the active condition to the standby condition by means of a deactivation of the oscillator. When the interface is in the standby condition, the system is operative for switching the interface from the standby condition to the active condition when the beginning of a transmission of a second message is detected on the CEC channel by activating the timer and the oscillator, detecting the transmission start bit of the second message via the timer using a second plurality of reference values, wherein the second reference values are different from the first reference values, and reconstructing and processing the second message.

The invention also regards the corresponding communication method, as well as a computer program product, that can be loaded into the memory of at least one computer and comprises parts of software code that can execute the steps of the method when the product is run on at least one computer. As used herein, the reference to such a computer program product is understood as being equivalent to the reference to a computer-readable means containing instructions for control of the computer system in order to co-ordinate implementation of the method according to the invention. Reference to "at least one computer" is evidently intended to highlight the possibility for the present invention to be implemented in a modular and/or distributed form.

Further advantageous characteristics of the invention form the subject of the annexed dependent claims.

The claims form an integral part of the technical teaching provided herein in relation to the invention.

In one embodiment, it is envisaged that the oscillator of the HDMI communication interface is deactivated when the device (i.e., the HDMI communication interface) goes into standby.

In one embodiment, the standby condition is activated when the communication interface has executed or processed the operations requested and no other activities to be performed are envisaged.

In one embodiment, the oscillator of the interface is reactivated in an asynchronous way (i.e., when start of a transmission on the CEC channel is detected.

In one embodiment, the start of a transmission also activates a timer. In particular, this timer can be used for detecting the start of a transmission, i.e., the initial bit of a transmission, correctly.

In one embodiment, the timer is compared with a first plurality of reference values (i.e., a first reference value for the duration of the low period of the bit and a first reference value for the duration of the bit time) when the interface is turned on and functions normally (i.e., when the interface is not in standby), and with a second plurality of reference values (i.e., a second reference value for the duration of the low period of the bit and a second reference value for the duration of the bit time) when the interface is in standby, with the second reference values different from the first reference values.

This enables reduction in the consumption of the interface in the standby condition, guaranteeing that the initial bit of a transmission is detected correctly, even though some milliseconds elapse until the oscillator is reactivated.

BRIEF DESCRIPTION OF THE DRAWINGS

The invention will now be described, purely by way of non-limiting example with reference to the annexed drawings, wherein.

DETAILED DESCRIPTION OF PREFERRED EMBODIMENTS

In the ensuing description, various specific details are illustrated aimed at providing an in-depth understanding of the embodiments. The embodiments can be obtained without one or more of the specific details, or with other methods, components, materials, etc. In other cases, well-known structures, materials, or operations are not illustrated or described in detail so as not to render various aspects of the embodiments obscure.

Reference to "an embodiment" or "one embodiment" in the framework of this description is aimed at indicating that a particular configuration, structure or characteristic described in relation to the embodiment is included in at least one embodiment. Hence, phrases such as "in an embodiment" or "in one embodiment" that may be present in different points of this description do not necessarily refer to one and the same embodiment. Furthermore, particular conformations, structures, or characteristics can be combined in an adequate way in one or more embodiments.

The references used herein are only adopted for reasons of convenience and hence do not define the sphere of protection or the scope of the embodiments.

Figure 1:
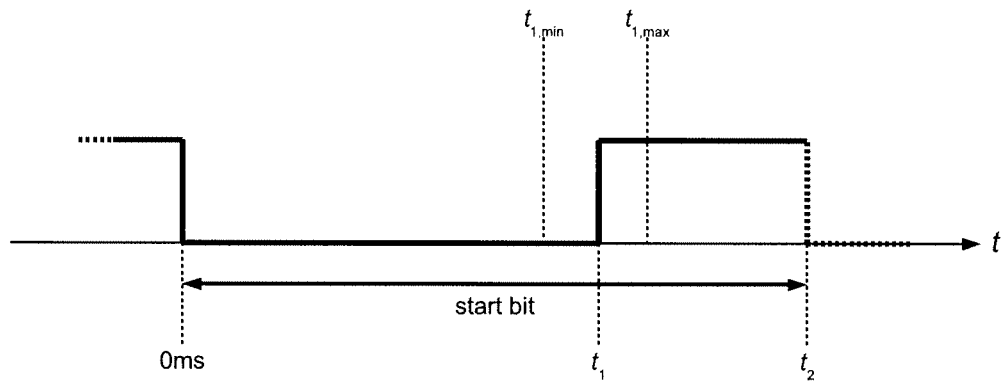
FIG. 1 shows an example of waveform of the initial bit of a transmission on the CEC channel according to the HDMI standard.

FIG. 1 shows an example of waveform of the initial bit (start bit) of a transmission on the CEC line according to the HDMI standard.

In particular, in the HDMI standard it is envisaged that the change from the logic level '1' to the logic level '0' indicates the start of a transmission and hence also the start of the initial bit or "start bit" of the transmission.

Subsequently, the CEC line changes again from the logic level '0' to the logic level '1'. In the HDMI standard it is envisaged that this change occurs at the instant $t_1=3.7$ ms, with a tolerance of +/−0.2 ms. This means that the change can occur between the instant $t_{1,min}=3.5$ ms and the instant $t_{1,max}=3.9$ ms. The total duration of the start bit is typically $t_2=4.5$ ms, after which the other bits of the transmission follow.

Figure 2:
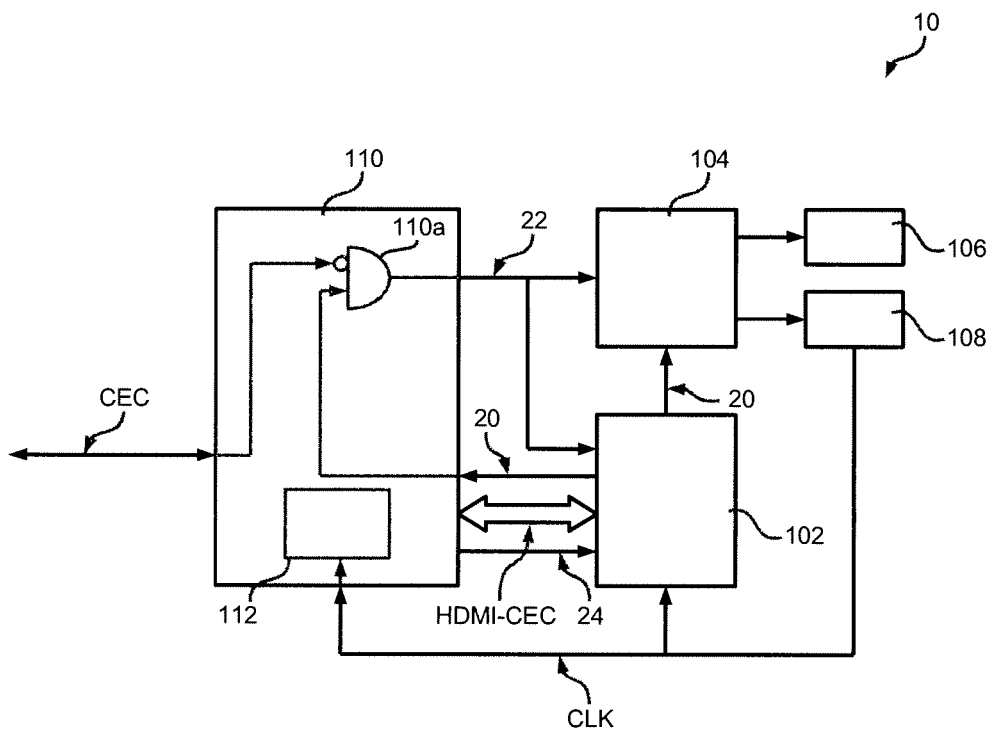
FIG. 2 is a block diagram of an embodiment of a communication interface for the CEC line of an HDMI device.

FIG. 2 shows an embodiment of a communication system 10 for a CEC line of an HDMI communication interface.

In the embodiment considered, the interface 10 comprises a processing unit 102, for example a CPU, which manages the communication of the HDMI interface at a high level, i.e., at a level of commands and messages of the HDMI-CEC type.

In the embodiment considered, there is also provided a communication module 110 that manages the communication on the CEC line at a low level, i.e., the transmission and/or reception of the HDMI-CEC messages on the CEC line.

For example, when the CPU 102 requests transmission of an HDMI-CEC message, the module 110 converts the message into a sequence of bits that is transmitted on the CEC line in compliance with the HDMI standard. The module 110 can also generate at the end of the transmission an interrupt 24 that is transmitted to the CPU 102.

Instead, when the module 110 detects a transmission on the CEC line, the module 110 reconstructs the corresponding HDMI-CEC message and, at the end of reception, signals the HDMI-CEC message to the CPU 102. For example, for detecting the start bit, a timer 112 can be used. Also in this case, the module 110 can, at the end of reception, generate an interrupt 24 transmitted to the CPU 102.

In the ensuing embodiments, the processing unit 102 can manage at least one command of turning-on and one command of turning-off of the device.

When the interface 10 receives a turning-off command, the CPU 102 instructs the device to turn off and sets the interface 10 in standby.

In the embodiment considered, the CPU 102 transmits a standby signal 20 to a block 104 that manages a supply network 106 and an oscillator 108. For example, the oscillator 108 can drive both the processing unit 102 and the communication module 110.

The inventors have found that consumption during the standby mode can be reduced significantly if the block 104 deactivates the supply of the rest of the device and furnishes supply only to the interface 10. The consumption can be reduced further if the block 104 deactivates also the oscillator 108.

In the embodiment considered, the interface 10 is reactivated if the CEC line indicates the start of a transmission. In particular, in the ensuing embodiments the communication module 110 generates an asynchronous signal of reactivation (wake-up) 22 when the start of a transmission is detected.

For example, the wake-up signal 22 can be generated when the device is in standby and when the CEC line changes from the logic level '1' to the logic level '0'. For example, the check can be made via an AND gate 110a that has as input the CEC line inverted and the standby signal 20.

In the embodiment considered, the wake-up signal 22 drives the block 104. In this way, the block 104 can reactivate the oscillator 108, enabling normal operation of the communication module 110. Furthermore, the wake-up signal 22 can also drive the processing unit 102 to reactivate it if necessary.

In one embodiment, the block 104 reactivates the supply of the rest of the device only when the block 104 receives a request from the CPU. For example, the CPU 102 can annualise first the message received and reactivate the supply only if the message is effectively a turning-on command.

The inventors have noted that in this type of interface 10 malfunctioning may be encountered.

To detect the start bit correctly, the communication module 110 monitors the CEC line and checks whether the logic level remains at '0' during the period between 0 ms and $t_{1,min}=3.5$ ms and becomes '1' before the instant $t_{1,max}=3.9$ ms.

For example, in one embodiment, the timer 112 is always activated by the trailing edge of the CEC line and proceeds up to the next trailing edge, when the timer is automatically reset and reactivated to evaluate the next bit. During count, the module 110 keeps track of the count value of the timer 112 present at the rising edge of the CEC line, and of the end-of-count value. These two values are compared with the ones requested by the communication standard to evaluate the type of datum received (i.e., start bit, zero, 1, error bit, or datum not valid) within the tolerance margins envisaged.

However, from when there is detection of the start of a transmission to when the oscillator 108 restarts to enable proper operation of the module 110 there may elapse a time interval (for example, even of the order of milliseconds) such that the module 110 cannot manage to verify properly whether the start bit changes the logic level between $t_{1,min}=3.5$ ms and $t_{1,max}=3.9$ ms.

The inventors have also noted that, at least in principle, this problem could be tackled in the following ways:

avoiding turning off of the oscillator 108; or causing the communication module to verify only whether the logic level changes for the first bit, without verifying the exact moment of the change.

The first solution implies an additional consumption, whereas the second solution can cause the communication module not to detect the start bit correctly, thus causing possible errors in the detection of the ensuing bits.

In one embodiment considered herein, the communication module uses different temporal criteria for detecting the start bit, for example change from the logic level '0' to the logic level '1'. In particular, when the interface 10 is functioning normally, operation is according to standard time rates, as illustrated with reference to FIG. 1, whereas, when the interface 10 exits the state of standby, operation is with modified time rates.

Figure 3:
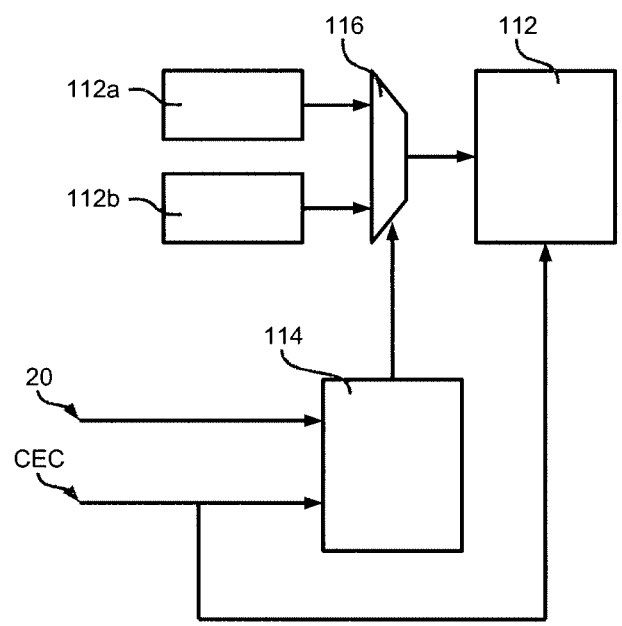
FIG. 3 shows details of the communication interface of FIG. 2.

FIG. 3 shows a corresponding circuit that can be implemented within the communication module 110.

In the embodiment considered, a timer 112 is provided, activated with the start of a transmission on the CEC line, i.e., with the start of the start bit. When the interface functions normally, the count value of the timer 112 is compared with standard reference values 112*a* (for example, representative count values for $t_{1,min}$=3.5 ms and $t_{1,max}$=3.9 ms), whilst in conditions of standby the timer 112 is compared with modified reference values 112*b*.

In one embodiment, the module 110 uses for the modified reference values 112*b* count values that represent $t_{1,min}$=3.5 ms−Twk$_{max}$, where Twk$_{max}$ is the time required for reactivation of the interface 10, and $t_{1,max}$=3.9 ms−Twk$_{min}$, where Twk$_{min}$ is the minimum time required for reactivation of the interface 10.

For example, in the embodiment considered a control module 114 is provided that drives a multiplexer 116 for selecting the standard reference values or the reference values modified as a function of the standby signal 20 received from the CPU 102.

In the embodiment considered, the control module 114 also guarantees that the reference values remain stable when the timer 112 has been activated. In fact, the standby signal is typically asynchronous, and once the system has been reactivated, the value of the standby signal usually returns to the logic level '0'. Hence, a driving of the multiplexer 116 directly via standby signal 20 could cause the reference values to return to the standard values 112*a* envisaged for normal operation.

In one embodiment, the reference values change from the modified values 112*b* to the standard values 112*a* when the control module 114 has detected the start bit at exit from the standby mode.

The inventors have noted that the foregoing operations can also be implemented via software in existing systems. The CPU 102 can in fact change the contents of the registers that contain the reference values for the timer 112 before the standby mode is activated. Subsequently, once the interface 10 has been reactivated, the CPU 102 could again write the standard reference values in the registers.

Of course, without prejudice to the principle of the invention, the details of construction and the embodiments may vary widely with respect to what has been described and illustrated purely by way of example, without thereby departing from the scope of the present invention, as defined by the ensuing claims.

The invention claimed is:

1. A communication system for a Consumer Electronics Control (CEC) channel of a High-Definition Multimedia Interface (HDMI) communication interface being switchable between an active condition and a standby condition, said system comprising:
   a communication module for receiving messages from said CEC channel, said communication module including a timer,
   a processing unit for processing said received messages, and
   an oscillator separate from said timer for driving said communication module and providing a clock signal to said timer,
   wherein said system is configured for:
      when said interface is in said active condition:
         activating said timer when the beginning of a transmission of a first message is detected on said CEC channel,
         detecting the transmission start bit of said first message via said timer using a first plurality of reference values,
         reconstructing and processing said first message, and
         detecting the presence of other remaining activities to be performed and, in the absence of other remaining activities, switching said interface from said active condition to said standby condition by means of a deactivation of said oscillator, and
      when said interface is in said standby condition:
         switching said interface from said standby condition to said active condition when the beginning of a transmission of a second message is detected on said CEC channel by activating said timer and said oscillator,
         detecting the transmission start bit of said second message via said timer using a second plurality of reference values, wherein said second reference values are different from said first reference values,
         reconstructing and processing said second message,
         wherein the reference values comprise timer count values.

2. The communication system of claim 1, wherein the beginning of a transmission on said CEC channel is detected if said channel CEC changes from the logic level '1' to the logic level '0'.

3. The communication system of claim 1, comprising a multiplexer for selecting either said first plurality of reference values or said second plurality of reference values as reference values for said timer.

4. The communication system of claim 3, comprising a control module for driving said multiplexer, wherein said control module ensures that the reference values of said timer remain stable till said transmission start bit of said second message has been detected.

5. The communication system of claim 1, wherein the beginning of a transmission is detected asynchronously.

6. The communication system of claim 1, wherein said first plurality of reference values includes a first reference value for the low period of the bit and a first reference value for the total bit time.

7. The communication system of claim 1, wherein said second plurality of reference values includes a second reference value for the low period of the bit and a second reference value for the total bit time.

8. The communication system of claim 1, wherein said communication module generates at the end of the reception of a message an interrupt, which is transmitted to said processing unit.

9. The communication system of claim 2, comprising a multiplexer for selecting either said first plurality of reference values or said second plurality of reference values as reference values for said timer.

10. The communication system of claim 9, comprising a control module for driving said multiplexer, wherein said control module ensures that the reference values of said timer remain stable until said transmission start bit of said second message has been detected.

11. The communication system of claim 8, wherein the beginning of a transmission is detected asynchronously.

12. The communication system of claim 8, wherein said first plurality of reference values includes a first reference value for the low period of the bit and a first reference value for the total bit time.

13. The communication system of claim 8, wherein said second plurality of reference values includes a second reference value for the low period of the bit and a second reference value for the total bit time.

14. The communication system of claim 8, wherein said communication module generates at the end of the reception of a message an interrupt, which is transmitted to said processing unit.

15. A communication method for the CEC channel of a HDMI communication interface being switchable between an active condition and a standby condition, said interface comprising a communication module for receiving messages from said CEC channel, wherein said communication module includes a timer, a processing unit for processing said received messages, and an oscillator separate from said timer for driving said communication module and providing a clock signal to said timer, said method comprising:
   a) when said interface is in said active condition:
      activating said timer when the beginning of a transmission of a first message is detected on said CEC channel,
      detecting the transmission start bit of said first message via said timer using a first plurality of reference values,
      reconstructing and processing said first message, and
      detecting the presence of other remaining activities to be performed and, in the absence of other remaining activities, switching said interface from said active condition to said standby condition by means of a deactivation of said oscillator, and
   b) when said interface is in said standby condition:
      switching said interface from said standby condition to said active condition when the beginning of a transmission of a second message is detected on said CEC channel by activating said timer and said oscillator,
      detecting the transmission start bit of said second message via said timer using a second plurality of reference values, wherein said second reference values are different from said first reference values, and
      reconstructing and processing said second message,
   wherein the reference values comprise timer count values.

16. A computer program product loadable into a non-transitory memory of a computer and including software code portions adapted for performing the method of claim 15 when the product is run on a computer.

17. A communication method for the CEC channel of a HDMI communication interface, said method comprising:
   providing a communication module for receiving messages from said CEC channel, said communication module including a timer;
   providing a processing unit for processing said received messages;
   providing an oscillator separate from said timer for driving said communication module and providing a clock signal to said timer; and
   switching said interface between an active condition and a standby condition,
   wherein the timer receives a first and a second plurality of reference values each comprising timer count values and wherein said second reference values are different from said first reference values; and
   when said interface is in said active condition:
   activating said timer when the beginning of a transmission of a first message is detected on said CEC channel;
   detecting the transmission start bit of said first message via said timer using the first plurality of reference values;
   reconstructing and processing said first message; and
   detecting the presence of other remaining activities to be performed and, in the absence of other remaining activities, switching said interface from said active condition to said standby condition by means of a deactivation of said oscillator; and
   when said interface is in said standby condition:
   switching said interface from said standby condition to said active condition when the beginning of a transmission of a second message is detected on said CEC channel by activating said timer and said oscillator;
   detecting the transmission start bit of said second message via said timer using the second plurality of reference values; and
   reconstructing and processing said second message.

18. The method of claim 17, wherein the beginning of a transmission is detected asynchronously.

* * * * *